(12) United States Patent
Gaber et al.

(10) Patent No.: US 10,956,541 B2
(45) Date of Patent: Mar. 23, 2021

(54) DYNAMIC OPTIMIZATION OF SOFTWARE LICENSE ALLOCATION USING MACHINE LEARNING-BASED USER CLUSTERING

(71) Applicant: EMC IP Holding Company LLC, Hopkinton, MA (US)

(72) Inventors: Shiri Gaber, Beer Shev (IL); Oshry Ben-Harush, Kibbutz Galon (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

(21) Appl. No.: 16/431,941

(22) Filed: Jun. 5, 2019

(65) Prior Publication Data

US 2020/0387584 A1  Dec. 10, 2020

(51) Int. Cl.
| | |
|---|---|
| *G06F 21/10* | (2013.01) |
| *G06F 11/34* | (2006.01) |
| *G06K 9/62* | (2006.01) |
| *G06N 20/00* | (2019.01) |

(52) U.S. Cl.
CPC ........ *G06F 21/105* (2013.01); *G06F 11/3466* (2013.01); *G06K 9/6218* (2013.01); *G06N 20/00* (2019.01)

(58) Field of Classification Search
CPC . G06F 21/105; G06F 11/3466; G06K 9/6218; G06N 20/00
See application file for complete search history.

(56) References Cited

U.S. PATENT DOCUMENTS

| | | | |
|---|---|---|---|
| 6,938,027 B1 * | 8/2005 | Barritz | G06Q 10/00 706/50 |
| 2002/0107809 A1 * | 8/2002 | Biddle | G06F 21/105 705/59 |
| 2006/0059556 A1 | 3/2006 | Royer | |

(Continued)

OTHER PUBLICATIONS

U.S. Appl. No. 15/961,035 entitled, "Deep Reinforcement Learning for Workflow Optimization Using Provenance-Based Simulation", filed Apr. 24, 2018.

(Continued)

*Primary Examiner* — Sher A Khan
(74) *Attorney, Agent, or Firm* — Ryan, Mason & Lewis, LLP

(57) ABSTRACT

Techniques are provided for software license optimization using machine learning-based user clustering. One method comprises obtaining key performance indicators indicating individual usage by a plurality of users of a software product; applying at least one function to the key performance indicators to obtain a plurality of time dependent features; processing the time dependent features using a machine learning model to cluster the users into a plurality of persona clusters; and determining a number of each available license type for the software product for the plurality of users based on the persona clusters. The key performance indicators comprise, for example, user behavioral data with respect to usage of the software product and/or performance data with respect to usage of the software product. One or more policies can be determined for managing an allocation of the available license types for the software product to the plurality of users.

20 Claims, 7 Drawing Sheets

(56) References Cited

U.S. PATENT DOCUMENTS

| | | | |
|---|---|---|---|
| 2009/0031286 A1* | 1/2009 | Yee | G06Q 10/06 |
| | | | 717/120 |
| 2014/0052610 A1* | 2/2014 | Aggarwal | G06F 21/00 |
| | | | 705/39 |
| 2015/0081876 A1 | 3/2015 | Pieczul et al. | |
| 2015/0350338 A1 | 12/2015 | Barnett et al. | |
| 2016/0004567 A1* | 1/2016 | Michel | G06F 9/505 |
| | | | 718/104 |
| 2016/0142511 A1* | 5/2016 | Smith | H04L 67/327 |
| | | | 709/223 |
| 2016/0253641 A1* | 9/2016 | Smith | H04L 63/08 |
| | | | 726/7 |
| 2017/0004436 A1 | 1/2017 | Bastide et al. | |
| 2017/0353565 A1* | 12/2017 | Kumar | H04L 67/125 |
| 2018/0107962 A1 | 4/2018 | Lundin et al. | |
| 2018/0321927 A1* | 11/2018 | Borthakur | G06F 8/61 |
| 2019/0318064 A1* | 10/2019 | Paladino | G06F 11/3409 |
| 2020/0167444 A1* | 5/2020 | Singri | G06F 8/65 |

OTHER PUBLICATIONS

U.S. Appl. No. 16/145,536 entitled, "System Operational Analytics Using Normalized Likelihood Scores", filed Sep. 28, 2018.
U.S. Appl. No. 16/173,291 entitled, "Identifying Anomalies in User Internet of Things Activity Profile Using Analytic Engine", filed Oct. 29, 2018.
U.S. Appl. No. 16/401,610 entitled, "Evaluating Software License Usage Using Reinforcement Learning Agents", filed May 2, 2019.

* cited by examiner

DYNAMIC OPTIMIZATION OF SOFTWARE LICENSE ALLOCATION USING MACHINE LEARNING-BASED USER CLUSTERING

FIELD

The field relates generally to the evaluation of software product usage and allocation.

BACKGROUND

Many software products, such as the Matlab® computing environment and programming language, commercially available from The MathWorks, Inc., use a hybrid license model where you can buy a first type of license, often referred to as a standalone software license, for a single user at one price, or a second type of license for multiple users (but typically only a single user at one time), often referred to as a floating or a flexible software license, typically at a significantly higher cost. It is often challenging for an organization to determine an appropriate number of licenses to acquire of each license type in order to maximize productivity with respect to the particular software product, while also minimizing costs. Determining the appropriate number of each license type is often based on the amount of time that each user spends using the software, among other behavioral measures. If a particular user uses the software more than 20% of his or her work hours, for example, then a standalone software license may be best.

Among other challenges, it is often difficult to determine when the license is in use, as users may remain logged into the software product without actually using the software. A need therefore exists for techniques for evaluating software license usage that generate reliable estimations regarding the needed number of each license type.

SUMMARY

In one embodiment, a method comprises obtaining a plurality of key performance indicators indicating individual usage by a plurality of users of a software product; applying at least one function to the plurality of key performance indicators to obtain a plurality of time dependent features; processing the plurality of time dependent features using at least one machine learning model to cluster the plurality of users into a plurality of persona clusters; and determining a number of each of a plurality of license types for the software product for the plurality of users based on the plurality of persona clusters.

In some embodiments, the key performance indicators comprise, for example, user behavioral data with respect to usage of the software product and/or performance data with respect to usage of the software product. In one or more embodiments, one or more policies are also determined for managing an allocation of the available license types for the software product to the plurality of users.

Other illustrative embodiments include, without limitation, apparatus, systems, methods and computer program products comprising processor-readable storage media.

DETAILED DESCRIPTION

Figure 1:
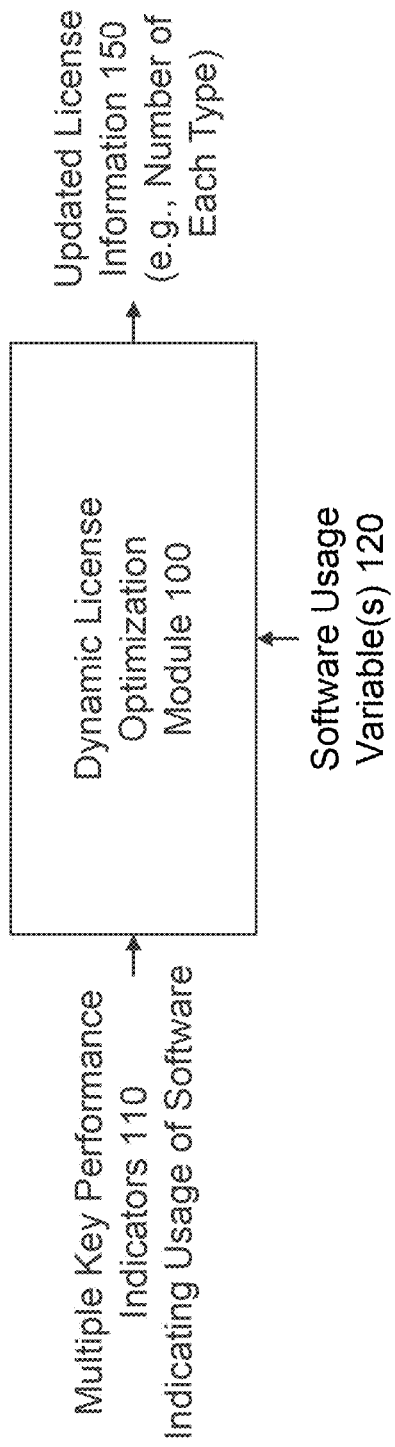
FIG. 1 illustrates an exemplary dynamic license optimization module for software usage evaluation, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for software license optimization using machine learning-based user clustering.

Modern information technology (IT) organizations aim to provide advanced technological solutions at a competitive cost. In the current business environment, IT organizations are competing with large platform and service providers and need to optimize every aspect of their operation.

Among other benefits, the disclosed software license optimization techniques improve software licensing management through machine learning and optimization. For improved licensing management, organizations should dynamically understand a desirable (e.g., optimal) number of licenses to obtain for each available licensing type (e.g., standalone software licenses for a single user or a floating or a flexible software license for multiple users) that will fit the needs of the organization. In order to decrease costs, an organization needs to purchase as few licenses as possible, while also ensuring that there is no starvation that may limit employee productivity. Thus, the disclosed software license optimization techniques reduce IT costs and limit business and legal risk related to the ownership and usage of software, while also improving IT responsiveness and end user productivity based on reliable usage data.

One or more embodiments of the disclosure employ a statistical, machine learning-based method that balances between the licensing costs and the starvation time (e.g., an employee being denied access to the software product because all available licenses are being used). A machine learning model identifies behavioral patterns in software usage data in order to optimize Software Asset Management (SAM), as discussed further below. Existing SAM solutions are based on inaccurate metadata of software requirements (e.g., requests, user logins and user rejections). Further most existing SAM tools are descriptive by nature (e.g., the main functionality is collecting and displaying usage data via reports and dashboards from across an IT organization).

Among other benefits, the software license optimization techniques allow an organization to better select between standalone user licenses and floating user licenses, for example, for the user and additional users in the organization. One or more embodiments recognize that there is a need to optimize the respective number of flexible software licenses and single user (standalone) software licenses. As noted above, many users tend to stay logged-in to a given software product, even when not actually using the software. Thus, deciding whether a standalone license for a given user is appropriate is significantly more difficult.

FIG. 1 illustrates an exemplary dynamic license optimization module 100 for software usage evaluation, according to an embodiment of the disclosure. As shown in FIG. 1, the exemplary dynamic license optimization module 100 processes a number of key performance indicators (KPIs) 110 indicating usage of the software product, together with a number of software usage variables 120, to determine updated license information 150 (e.g., number of each license type for an organization).

In one or more embodiments, the collected KPIs 110 include, for example, a resource usage (e.g., central processing unit (CPU), graphics processing unit (GPU), memory, input/output, and network resources) for a given application. In addition, the exemplary software usage variables 120 generally indicate usage of the software product and comprise, for example, an amount of time the monitored software product was active on a user display, and user interface interactions (e.g., mouse and keyboard clicks and, optionally, the content of user interface interactions) in a predefined time window. In addition, login and logout times of the users can also be collected in some embodiments.

In some embodiments, the dynamic license optimization module 100 processes one or more of the collected KPIs 110 to determine an amount of time that the application window for the monitored software product was active on the screen of the user in the predefined time window, as well as an amount of user interface interactions (e.g., mouse clicks and keyboard activity) in the predefined time window.

Figure 2:
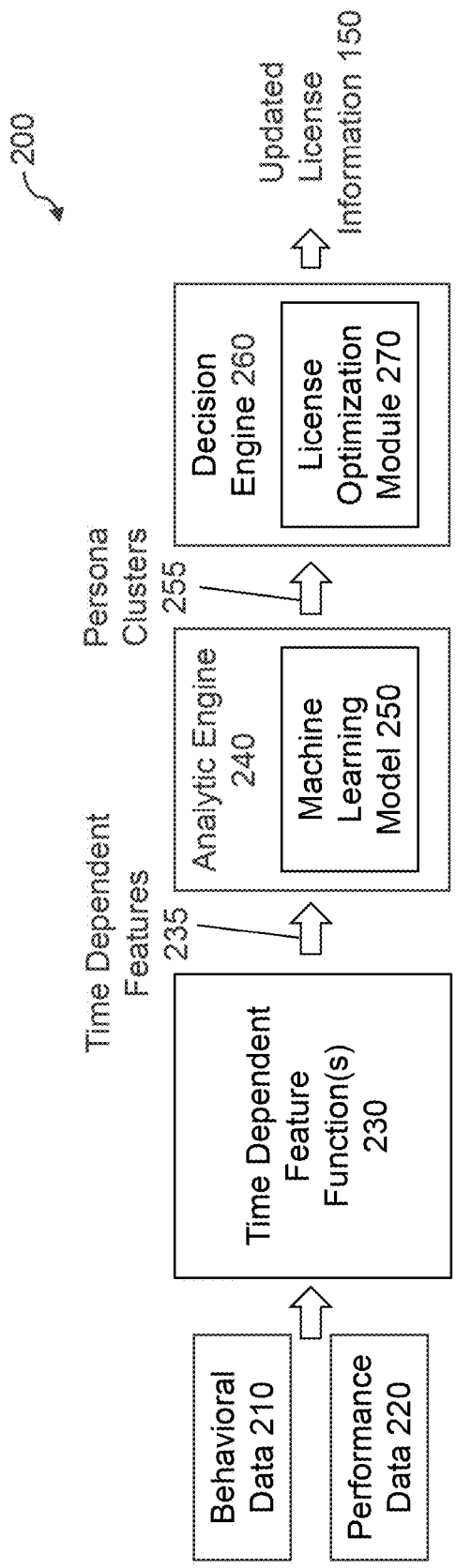
FIG. 2 illustrates an exemplary software license optimization system, according to at least one embodiment of the disclosure.

FIG. 2 illustrates an exemplary software license optimization system 200, according to at least one embodiment of the disclosure. As shown in FIG. 2, the exemplary software license optimization system 200 processes behavioral data 210 and performance data 220, and generates the updated license information 150 (e.g., number of each license type for an organization).

In at least some embodiments, the exemplary software license optimization system 200 comprises one or more time dependent feature function(s) 230 that obtain multiple time dependent features 235 that are present in the behavioral data 210 and/or performance data 220. The time dependent features 235 optionally comprise one or more aggregated features.

The exemplary software license optimization system 200 also comprises an analytic engine 240 that comprises a machine learning model 250. Generally, the machine learning model 250 processes the time dependent features 235 to cluster the users of at least a portion of an organization into multiple persona clusters 255 (as discussed further below in conjunction with FIG. 4).

As shown in FIG. 2, a decision engine 260 comprises a license optimization module 270 that applies an optimization process to the persona clusters 255 to determine a number of each available license type for the software product for the various users of an organization. In one or more embodiments, the persona clusters 255 each have an assigned weight (for example, defined by an enterprise and/or learned from the KPIs 110). In some embodiments, the license optimization module 270 further determines one or more policies for managing an allocation of the available license types for the software product to the plurality of users, as discussed further below in conjunction with FIG. 3. As used herein, an allocation of one or more license types shall include acquiring, deploying and/or assigning the available licenses based on the number of each license type determined in accordance with the disclosed techniques, as would be apparent to a person of ordinary skill in the art.

Figure 3:
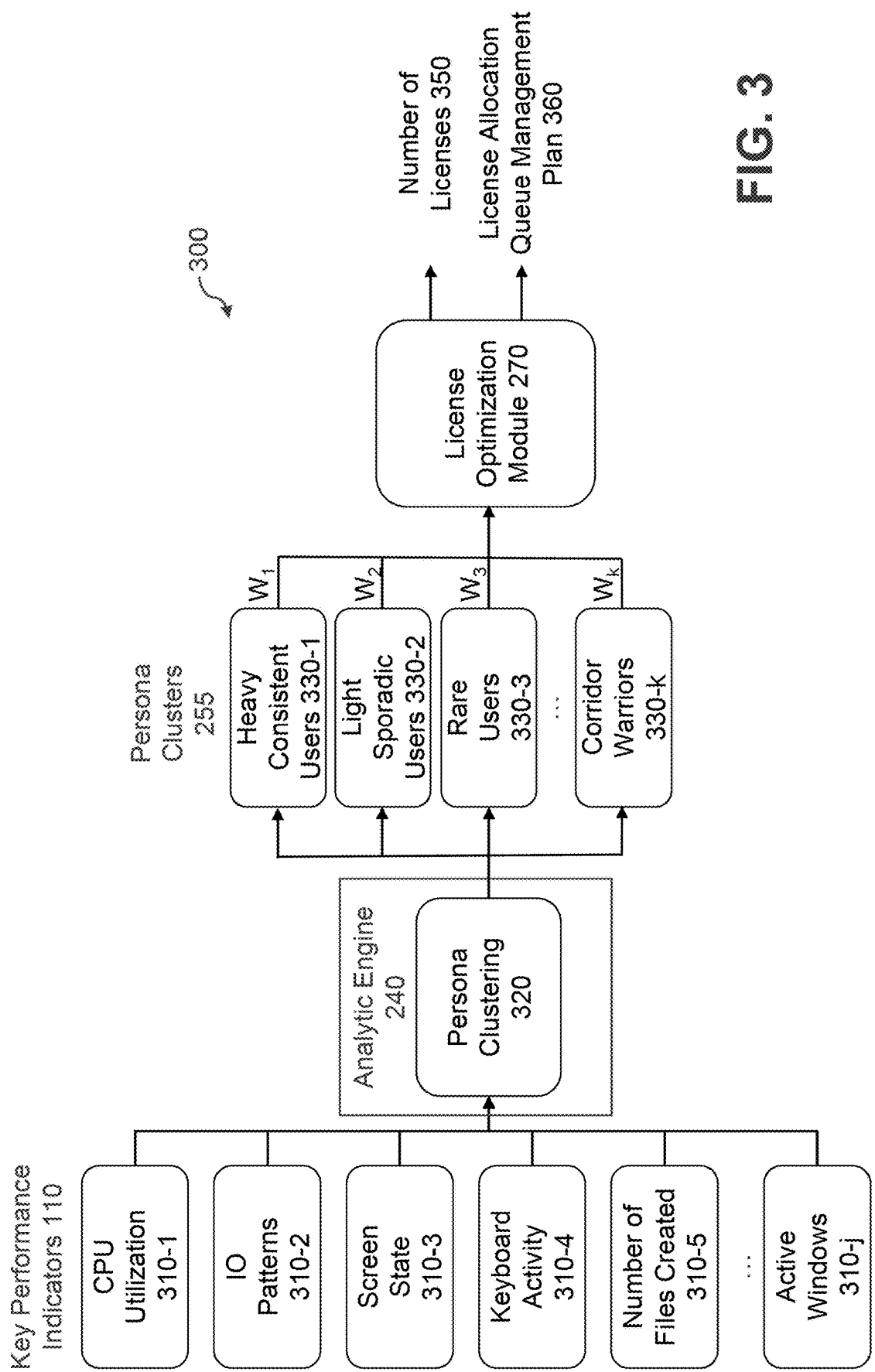
FIG. 3 illustrates the exemplary software license optimization system of FIG. 2 in further detail, according to one or more embodiments.

FIG. 3 illustrates an exemplary software license optimization system 300, according to one or more embodiments. As shown in FIG. 3, the exemplary software license optimization system 300 processes a number of exemplary KPIs 310-1 through 310-$j$, such as CPU utilization 310-1, IO patterns 310-2, screen state 310-3 (e.g., screen on or off), keyboard activity 310-4, number of files created 310-5 and active windows 310-$j$ (and/or the active applications). In further variations, KIPs can include a process list, working hours disk I/O operations, mouse activity. The various KPIs 310 reflect actual usage of the software product for individual users, for example, for short-term and long-term statistics. The various KPIs 310 may be collected, for example, by the Dell Data Vault™ (DDV), commercially available from Dell EMC of Hopkinton, Mass.

The various KPIs 310 are applied to the analytic engine 240, which comprises a persona clustering module 320, as discussed further below in conjunction with FIG. 4, to generate the plurality of persona clusters 255. The persona clustering module 320 may employ, for example, K-means clustering and unsupervised learning, in order to associate users into different usage categories. In a further variation, Expectation Maximization algorithms are employed using Gaussian mixture models. The persona clustering module 320 is utilized in order to update license purchasing and distribution policies, using a user behavioral based load balancing mechanism (as opposed to randomly assigning licenses).

In some embodiments, unsupervised learning techniques are employed by the persona clustering module 320 as the outcome is unknown but patterns can be found in the usage data. It has been found that various role types often behave in a similar manner, for example, on a per-KPI basis, and should be assigned to same persona cluster 255. Iterative training may be employed by the persona clustering module 320 to find, for example, a center of mass for each persona cluster 255. In some embodiments, the iterative training aims to find a substantially minimal distance between points from the same persona cluster 255, and a substantially maximal distance between points for different persona cluster 255.

In one or more embodiments, an optimization algorithm, such as Knapsack algorithm, is employed to determine the number of clusters, as described, for example, on Wikipedia.

In the exemplary embodiment of FIG. 3, the plurality of persona clusters 255 comprises persona clusters 330-1 through 330-$k$, such as a heavy consistent users cluster 330-1, a light sporadic users cluster 330-2, a rare users cluster 330-3 and a corridor warriors cluster 330-$k$. Generally, the corridor warriors cluster 330-$k$ corresponds to workers that work inside a workplace building, who are mobile and spend most of their time away from their desks (with effectively zero usage of application). The "heavy consistent users" cluster is with respect to the amount of usage of the software product by the various users of the software product within an organization. The various persona clusters 330 correspond to different roles and/or titles in an enterprise organization. A given enterprise can define the various available persona clusters 330 and/or the persona clusters 330 can be learned from the KPIs 110.

As noted above, each persona cluster 255 is optionally assigned a weight $w_1$ through $w_k$ corresponding to actual usage of the software product. In the exemplary embodiment, the weights are determined by the analytic engine 240 based on a level of use for each persona, considering the individual KPIs 110 and the collection of KPIs 110. In some embodiments, the weights of the weighted persona clusters 330 are determined following the processing of the plurality of time dependent features 230 using the machine learning model 250, according to sorted averages of the time dependent features 230 belonging to users allocated to each of the weighted persona clusters 330.

As shown in FIG. 3, the weighted persona clusters 330 generated by the persona clustering module 320 are applied to the license optimization module 270. Generally, based on the weighted persona clusters 330 and the type and costs of available licenses, the license optimization module 270 determines a number (e.g., a substantially optimal number) and type of licenses required to enable the number of employees from the specific persona type.

In one or more embodiments, the license optimization module 270 determines the number and type of licenses using the following equation:

$$L(\vec{x}, \vec{w}) = f(p_f, p_s, \vec{x}) + \sum_{k=0}^{m} w_k x_k$$

where $\vec{x}$ is the number of users for each persona cluster 330, $\vec{w}$ is the weight for each persona cluster 330, pr is the price for a floating license type, ps is the price for a single user license type, m is the total number of clusters and k is the cluster index. The above equation addresses an optimization problem as in a Lagrangian framework for the number of each license type.

The output of the license optimization module 270 comprises, for example, a number of licenses 350 and a license allocation queue management plan 360. The number of licenses 350 comprises, for example, a number of each type of license to be used by the organization. The number of licenses 350 can optionally be expressed as an update (e.g., a delta) to the current number of licenses, such as reduce the number of floating licenses by 1200 and increase the number of single user (or standalone) licenses by 765.

In one or more embodiments, the license allocation queue management plan 360 comprises one or more policies (e.g., business rules) for managing an allocation of the various available license types for the software product to the various users of an organization. The allocation policies can be learned, for example, using simulation and reinforcement learning techniques. An allocation policy may allocate a floating license for a sporadic user only if a predefined number of licenses are available in the license pool.

Figure 4:
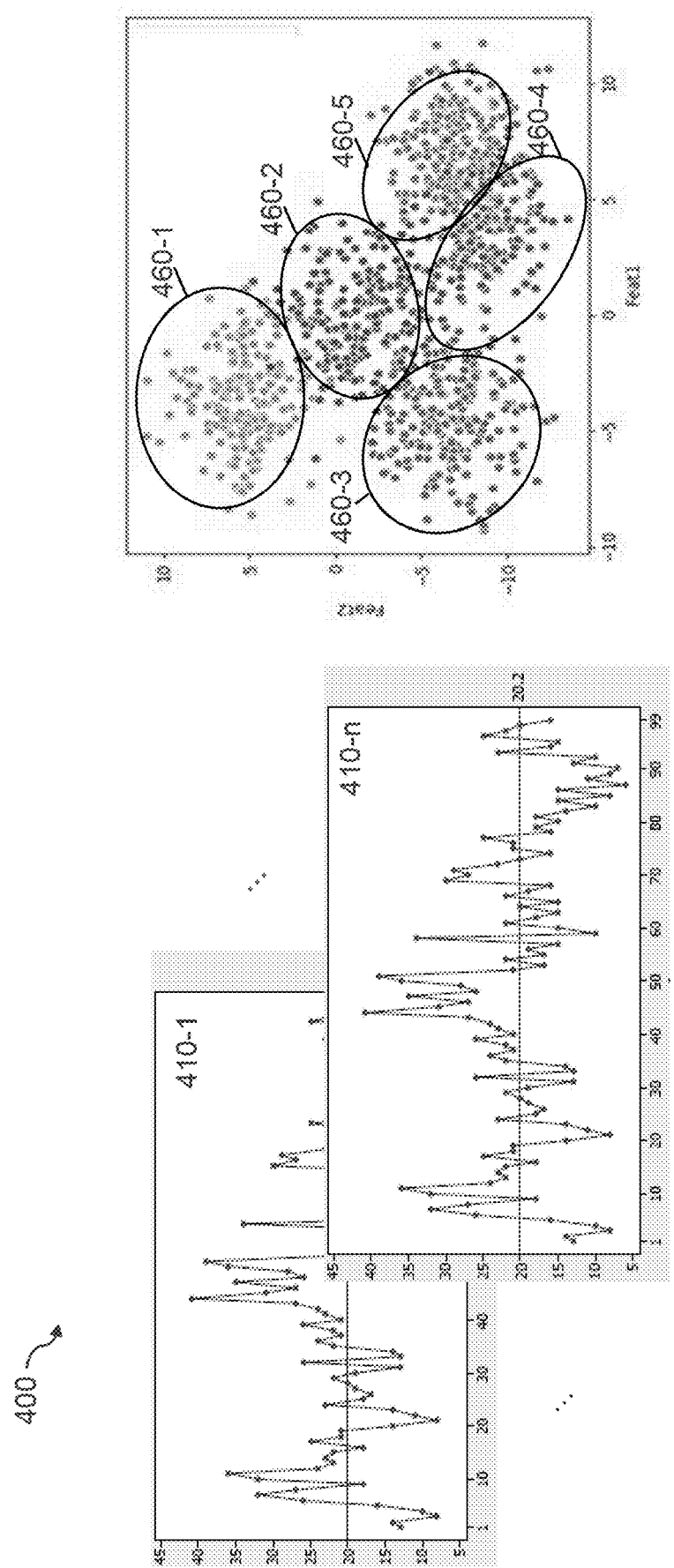
FIG. 4 illustrates a clustering of a number of time dependent features into user persona clusters, according to some embodiments of the disclosure.

FIG. 4 illustrates a clustering 400 of a number of time dependent features 410-1 through 410-$n$ into a plurality of exemplary user persona clusters 460-1 through 460-5, according to some embodiments of the disclosure. In some embodiments, one or more of the time dependent features 410 may comprise an aggregated feature for a level of software usage over time, that are based on a number of individual component features. For example, an aggregated feature may comprise a percentage of time that a high number of files were created by application, a percentage of time exhibiting a predefined high-level CPU consumption by an application and/or a percentage of time that a predefined CPU level is over a predefined limit. The time dependent features 410 (including aggregated features) can be expressed, for example, as a matrix, where each row contains the features extracted for each employee.

In further variations, one or more of the time dependent features 410 may express measures within a time window. For example, for each hour of a given day, one or more of the time dependent features 410 may express the following: a fraction of time that the application in question is used during the hour; a fraction of time that the application was active and interacted with during the hour; an average CPU utilization during the hour; a number of processes open during the hour; and a number of keystrokes during the hour.

Figure 5:
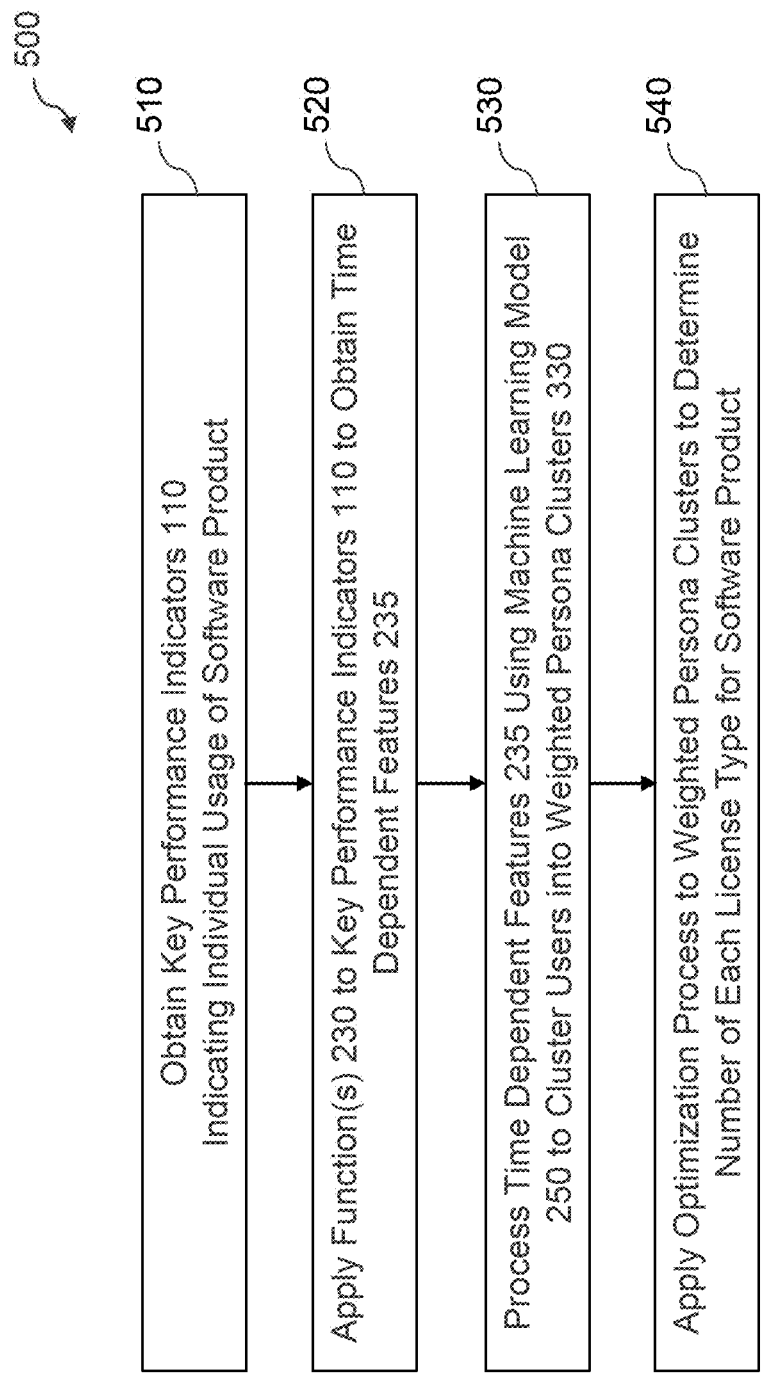
FIG. 5 is a flow chart illustrating an exemplary implementation of a software license optimization process, according to one or more embodiments.

FIG. 5 is a flow chart illustrating an exemplary implementation of a software license optimization process 500, according to one or more embodiments. As shown in FIG. 5, the exemplary software license optimization process 500 initially obtains a plurality of KPIs 110 during step 510 indicating individual usage by a plurality of users of a particular software product. For example, the KPIs 110 may comprise utilization indicators for one or more of processing resources, memory resources, network resources and input/output activity.

During step 520, the exemplary software license optimization process 500 applies one or more functions to the KPIs to obtain multiple time dependent features 235. Thereafter, the multiple time dependent features 235 are processed during step 530 using at least one machine learning model 250 to cluster the users into one or more weighted persona clusters 330. Finally, an optimization process is applied to the weighted persona clusters 330 during step 540 to determine a number of each of license type for the software product for the various users.

In some embodiments, the particular processing operations and other network functionality described in conjunction with the flow diagram of FIG. 5 are presented by way of illustrative example only, and should not be construed as limiting the scope of the disclosure in any way. Alternative embodiments can use other types of processing operations to evaluate a user's interaction with a monitored software product in order to make a decision about whether to automatically log out the user session. For example, the ordering of the process steps may be varied in other embodiments, or certain steps may be performed concurrently with one another rather than serially.

In one or more embodiments, behavioral patterns are identified in usage data collected in the field to improve Software Asset Management. A statistical, machine learning-based method is employed in some embodiments that balances between licensing costs and a starvation time. Among other benefits, the disclosed software product usage evaluation techniques determine an appropriate balance across all users between standalone (single user) software licenses and flexibles (multiple user) software licenses. Thus, the number of user rejections due to a lack of licenses is reduced, as well as expensive over-utilization. The license allocation is optionally automatically updated over time, reducing a dependence upon specific analysts that can lead to single point of failures, and the outputs lead to immediate business decisions regarding the software allocation. In addition, the disclosed software license optimization techniques are scalable for large organizations with growing volumes of behavioral data, utilizing big data computation platforms.

One or more embodiments of the disclosure provide improved methods, apparatus and computer program products for software license optimization for software products.

The foregoing applications and associated embodiments should be considered as illustrative only, and numerous other embodiments can be configured using the techniques disclosed herein, in a wide variety of different applications.

It should also be understood that the disclosed software product usage evaluation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for evaluating software product usage may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based software product usage evaluation engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based software product usage evaluation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
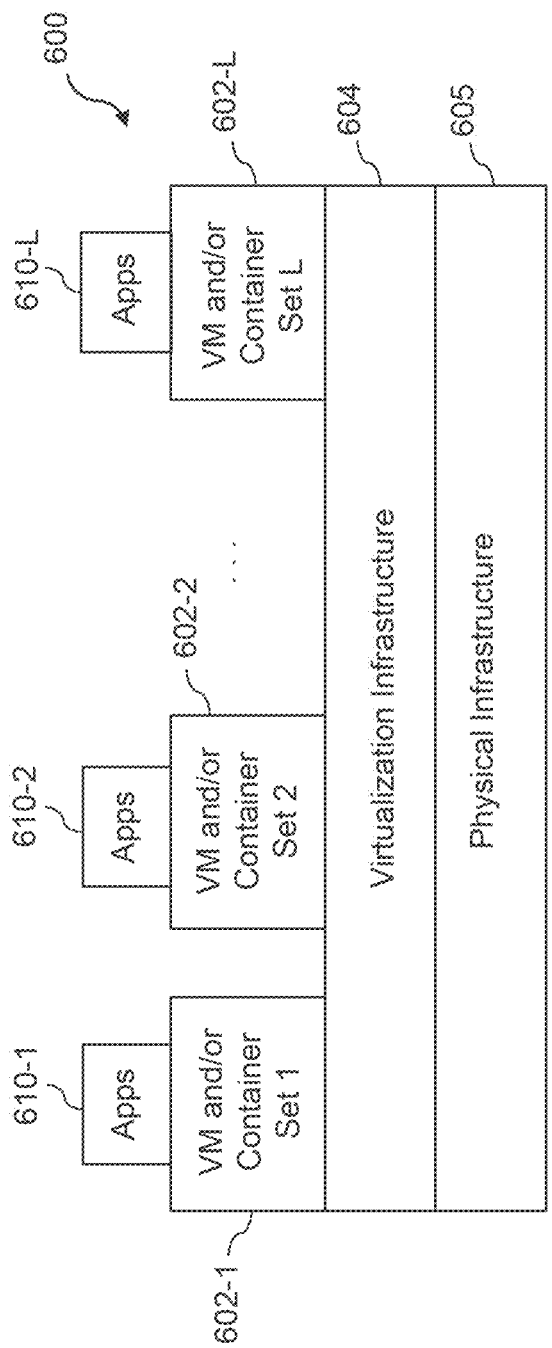
FIG. 6 illustrates an exemplary processing platform that may be used to implement at least a portion of one or more embodiments of the disclosure comprising a cloud infrastructure.
Figure 7:
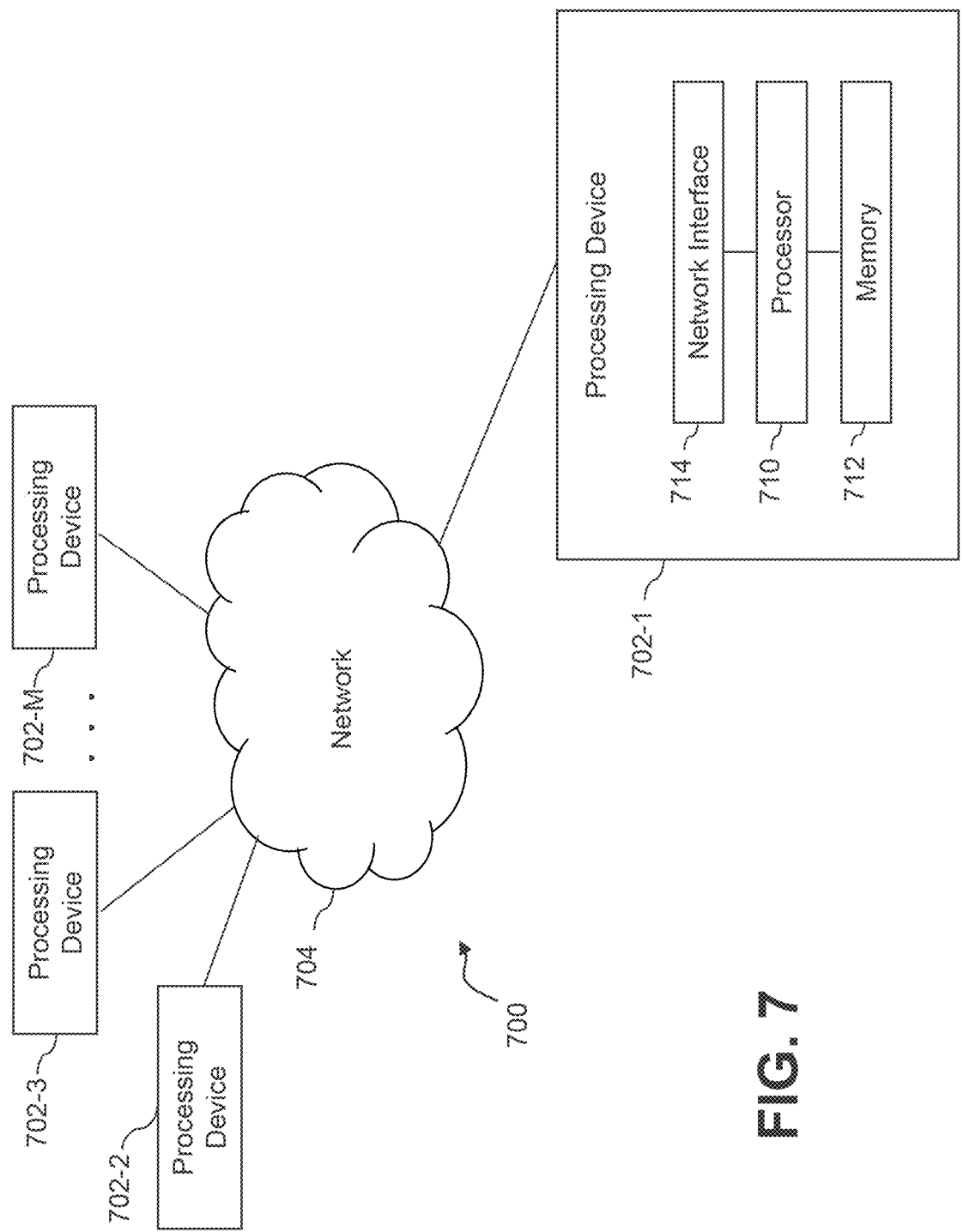
FIG. 7 illustrates another exemplary processing platform that may be used to implement at least a portion of one or more embodiments of the disclosure.

FIG. 6 shows an example processing platform comprising cloud infrastructure 600. The cloud infrastructure 600 comprises a combination of physical and virtual processing resources that may be utilized to implement at least a portion of an information processing system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide software product usage evaluation functionality of the type described above for one or more processes running on a given one of the VMs. For example, each of the VMs can implement software product usage evaluation control logic for providing recommendations for a number of each type of license of the monitored software product for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide software product usage evaluation functionality of the type described above for one or more processes running on different ones of the containers. For example, a container host device supporting multiple containers of one or more container sets can implement one or more instances of software product usage evaluation control logic for providing recommendations for a number of each type of license of the monitored software product.

As is apparent from the above, one or more of the processing modules or other components of RL module 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, ... 702-M, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of an information processing system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a plurality of key performance indicators indicating individual usage by a plurality of users of a software product, wherein the plurality of key performance indicators indicating individual usage of the software product comprise utilization indicators for one or more of processing resources, memory resources, network resources and input/output activity;
   applying at least one function to the plurality of key performance indicators to obtain a plurality of time dependent features;
   processing, using at least one processing device, the plurality of time dependent features using at least one machine learning model to cluster the plurality of users into a plurality of persona clusters, wherein one or more weights for the plurality of persona clusters are determined based at least in part on actual usage of the software product by users allocated to each of the persona clusters; and
   determining a number of each of a plurality of license types for the software product for the plurality of users based on the plurality of persona clusters.

2. The method of claim 1, wherein the plurality of key performance indicators further comprises one or more of user behavioral data with respect to usage of the software product and performance data with respect to usage of the software product.

3. The method of claim 1, wherein at least one of the plurality of distinct features within the data comprises an aggregated feature.

4. The method of claim 1, wherein the plurality of persona clusters is one or more of defined by an enterprise and learned from the plurality of key performance indicators.

5. The method of claim 1, wherein the plurality of persona clusters corresponds to one or more of roles and job titles in an enterprise.

6. The method of claim 1, wherein the determining further determines one or more policies for managing an allocation of one or more of the plurality of license types for the software product to the plurality of users.

7. The method of claim 1, further comprising one or more of selecting between a standalone user license and a floating user license for one or more of the users and allocating the plurality of license types for the software product to one or more of the users based on the determining.

8. The method of claim 1, wherein one or more of the weights for the plurality of persona clusters are determined following the processing of the plurality of time dependent features using the at least one machine learning model, according to sorted averages of the time dependent features belonging to users allocated to each of the persona clusters.

9. A computer program product, comprising a non-transitory machine-readable storage medium having encoded therein executable code of one or more software programs, wherein the one or more software programs when executed by at least one processing device perform the following steps:

obtaining a plurality of key performance indicators indicating individual usage by a plurality of users of a software product, wherein the plurality of key performance indicators indicating individual usage of the software product comprise utilization indicators for one or more of processing resources, memory resources, network resources and input/output activity;

applying at least one function to the plurality of key performance indicators to obtain a plurality of time dependent features;

processing the plurality of time dependent features using at least one machine learning model to cluster the plurality of users into a plurality of persona clusters, wherein one or more weights for the plurality of persona clusters are determined based at least in part on actual usage of the software product by users allocated to each of the persona clusters; and determining a number of each of a plurality of license types for the software product for the plurality of users based on the plurality of persona clusters.

10. The computer program product of claim 9, wherein the plurality of key performance indicators further comprises one or more of user behavioral data with respect to usage of the software product and performance data with respect to usage of the software product.

11. The computer program product of claim 9, wherein the plurality of persona clusters corresponds to one or more of roles and job titles in an enterprise.

12. The computer program product of claim 9, wherein the determining further determines one or more policies for managing an allocation of one or more of the plurality of license types for the software product to the plurality of users.

13. The computer program product of claim 9, further comprising one or more of selecting between a standalone user license and a floating user license for one or more of the users and allocating the plurality of license types for the software product to one or more of the users based on the determining.

14. The computer program product of claim 9, wherein one or more of the weights for the plurality of persona clusters are determined following the processing of the plurality of time dependent features using the at least one machine learning model, according to sorted averages of the time dependent features belonging to users allocated to each of the persona clusters.

15. An apparatus, comprising:

a memory; and at least one processing device, coupled to the memory, operative to implement the following steps:

obtaining a plurality of key performance indicators indicating individual usage by a plurality of users of a software product, wherein the plurality of key performance indicators indicating individual usage of the software product comprise utilization indicators for one or more of processing resources, memory resources, network resources and input/output activity;

applying at least one function to the plurality of key performance indicators to obtain a plurality of time dependent features;

processing the plurality of time dependent features using at least one machine learning model to cluster the plurality of users into a plurality of persona clusters, wherein one or more weights for the plurality of persona clusters are determined based at least in part on actual usage of the software product by users allocated to each of the persona clusters; and determining a number of each of a plurality of license types for the software product for the plurality of users based on the plurality of persona clusters.

16. The apparatus of claim 15, wherein the plurality of key performance indicators further comprises one or more of user behavioral data with respect to usage of the software product and performance data with respect to usage of the software product.

17. The apparatus of claim 15, wherein the determining further determines one or more policies for managing an allocation of one or more of the plurality of license types for the software product to the plurality of users.

18. The apparatus of claim 15, further comprising one or more of selecting between a standalone user license and a floating user license for one or more of the users and allocating the plurality of license types for the software product to one or more of the users based on the determining.

19. The apparatus of claim 15, wherein one or more of the weights for the plurality of persona clusters are determined following the processing of the plurality of time dependent features using the at least one machine learning model, according to sorted averages of the time dependent features belonging to users allocated to each of the persona clusters.

20. The apparatus of claim 15, wherein the plurality of persona clusters is one or more of defined by an enterprise and learned from the plurality of key performance indicators.

\* \* \* \* \*